US012638655B2

(12) United States Patent
Kondo et al.

(10) Patent No.: US 12,638,655 B2
(45) Date of Patent: May 26, 2026

(54) LENS MECHANISM AND LENS DEVICE

(71) Applicant: FUJIFILM Corporation, Tokyo (JP)

(72) Inventors: Nobuyuki Kondo, Saitama (JP); Mitsuhiko Oka, Saitama (JP); Toshiaki Ezawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 236 days.

(21) Appl. No.: 18/471,313

(22) Filed: Sep. 21, 2023

(65) Prior Publication Data

US 2024/0111124 A1      Apr. 4, 2024

(30) Foreign Application Priority Data

Sep. 29, 2022      (JP) ................................. 2022-157108

(51) Int. Cl.
G02B 7/04        (2021.01)
G03B 5/00        (2021.01)

(52) U.S. Cl.
CPC    G02B 7/04 (2013.01); G03B 5/00 (2013.01)

(58) Field of Classification Search
CPC ....................................................... G02B 7/04
See application file for complete search history.

(56) References Cited

U.S. PATENT DOCUMENTS

| | | | | |
|---|---|---|---|---|
| 10,345,615 | B2 * | 7/2019 | Okuda | ...................... G03B 5/06 |
| 2012/0229927 | A1 | 9/2012 | Ohishi et al. | |
| 2022/0163752 | A1 * | 5/2022 | Sakakibara | ............ H02N 2/103 |

FOREIGN PATENT DOCUMENTS

| | | |
|---|---|---|
| JP | H0882320 | 3/1996 |
| JP | 2005107008 | 4/2005 |
| JP | 2010266574 | 11/2010 |
| JP | 2011242443 | 12/2011 |
| JP | 2013148752 | 8/2013 |
| JP | 2014048450 | 3/2014 |
| JP | 2015036746 | 2/2015 |
| JP | 2015210490 | 11/2015 |
| JP | 2018128704 | 8/2018 |
| JP | 2019040092 | 3/2019 |
| JP | 2021117415 | 8/2021 |
| WO | 2011068115 | 6/2011 |

OTHER PUBLICATIONS

"Notice of Reasons for Refusal of Japan Counterpart Application", issued on Mar. 31, 2026, with English translation thereof, p. 1-p. 8.

* cited by examiner

*Primary Examiner* — Edmond C Lau

(74) *Attorney, Agent, or Firm* — JCIPRNET

(57)        ABSTRACT

A lens mechanism includes a lens holding member that holds a lens, a movement member that is connected to the lens holding member and that moves in an optical axis direction, and a guide shaft that guides movement of the movement member. The movement member includes a bearing portion into which the guide shaft is inserted. The bearing portion includes a first portion and a second portion. The first portion comes into contact with the guide shaft. The guide shaft is movably inserted into the second portion.

12 Claims, 12 Drawing Sheets

LENS MECHANISM AND LENS DEVICE

CROSS-REFERENCE TO RELATED APPLICATIONS

This application claims priority under 35 USC 119 from Japanese Patent Application No. 2022-157108 filed on Sep. 29, 2022, the disclosure of which is incorporated by reference herein.

BACKGROUND OF THE INVENTION

1. Field of the Invention

The present disclosed technology relates to a lens mechanism and a lens device.

2. Description of the Related Art

Disclosed in JP2015-210490A is a lens barrel including a holding member, a driving member, a first guide member, a first barrel, a second guide member, a second barrel, and an adjustment unit. The holding member holds an optical element and includes a first guided portion and a second guided portion. The driving member moves the holding member in an optical axis direction. The first guide member guides the first guided portion in the optical axis direction. The first barrel holds the first guided portion and is movable in the optical axis direction. The second guide member guides the second guided portion in the optical axis direction. The second barrel holds the second guide portion. The adjustment unit changes the relative positions of the first guide unit and the second guide unit in a direction orthogonal to an optical axis.

Disclosed in JP2019-040092A is a lens barrel including a lens holding member, a guide member, and a cam member that is rotatable around an optical axis. The guide member includes a linear groove that guides movement of the lens holding member in an optical axis direction. The cam member includes a cam groove for movement of the lens holding member in the optical axis direction. The lens holding member includes a plurality of first roller members and a plurality of second roller members. At least one of the plurality of first roller members engages with the linear groove and the cam groove. The plurality of second roller members are in the same phases as the plurality of first roller members in a circumferential direction of the lens holding member respectively and are provided at positions separated from the plurality first roller members in the optical axis direction. The diameter of one of the plurality of second roller members that is provided in the same phase as at least one first roller member is smaller than the diameter of the at least one first roller member.

Disclosed in JP2021-117415A is an optical device in which a plurality of tilt-shift operations of an optical system can be performed. The optical device includes a plurality of driving units, a controller, and a detection unit. The plurality of driving units drive the plurality of tilt-shift operations. The controller controls the plurality of driving units to drive the optical system from a tilt-shift state before driving to a target tilt-shift state. The detection unit detects the direction of gravitational force with respect to the optical device. The controller sets, in accordance with the direction of gravitational force detected as above, the order in which the plurality of driving units are driven and a detection in which the plurality of driving units are driven.

SUMMARY OF THE INVENTION

One embodiment according to the present disclosed technology provides a lens mechanism and a lens device with which it is possible to achieve both of suppression of the rattling of a movement member and reduction of sliding friction of the movement member.

A lens mechanism according to a first aspect of the present disclosed technology comprises a lens holding member that holds a lens, a movement member that is connected to the lens holding member and that moves in an optical axis direction, and a guide shaft that guides movement of the movement member. The movement member includes a bearing portion into which the guide shaft is inserted, the bearing portion includes a first portion and a second portion, the first portion comes into contact with the guide shaft, and the guide shaft is movably inserted into the second portion.

According to a second aspect of the present disclosed technology, in the lens mechanism related to the first aspect, the first portion may be positioned on a first side of the bearing portion, and the second portion may be positioned on a second side of the bearing portion.

According to a third aspect of the present disclosed technology, in the lens mechanism related to the second aspect, the first side may be an object side, and the second side may be an image formation side.

According to a fourth aspect of the present disclosed technology, in the lens mechanism related to the first aspect, the first portion may include a protrusion portion that comes into contact with the guide shaft.

According to a fifth aspect of the present disclosed technology, in the lens mechanism related to the fourth aspect, the protrusion portion may be formed along a circumferential direction of the guide shaft.

According to a sixth aspect of the present disclosed technology, in the lens mechanism related to the fourth aspect, the protrusion portion may be formed in a convexly curved planar shape as seen in a longitudinal cross-sectional view and may come into contact with an outer peripheral surface of the guide shaft.

According to a seventh aspect of the present disclosed technology, the lens mechanism related to the first aspect may further include a cam tube that is disposed outside the movement member and an operation member that is connected to an outer side of the cam tube, the movement member may be provided with a cam shaft, the cam tube may include a cam groove that engages with the cam shaft, and the movement member may move in the optical axis direction in a case where the cam shaft moves along the cam groove as the operation member and the cam tube rotate.

According to an eighth aspect of the present disclosed technology, in the lens mechanism related to the seventh aspect, the number of a plurality of the cam shafts may be three.

According to a ninth aspect of the present disclosed technology, the lens mechanism related to the seventh aspect may further include a fixation member that is provided between the movement member and the cam tube and that supports the movement member and the cam tube.

According to a tenth aspect of the present disclosed technology, in the lens mechanism related to the ninth aspect, the guide shaft may be provided at the fixation member.

According to an eleventh aspect of the present disclosed technology, in the lens mechanism related to the first aspect, the movement member may be connected to an outer side of the lens holding member via an adjustment mechanism of the lens holding member.

According to a twelfth aspect of the present disclosed technology, in the lens mechanism related to the first aspect, the second portion may be separated from the guide shaft by a distance that is equal to or greater than 0.2% of a diameter of the guide shaft and is equal to or smaller than 0.6% of the diameter of the guide shaft.

According to a thirteenth aspect of the present disclosed technology, in the lens mechanism related to the first aspect, a first guide shaft may be provided as the guide shaft, and a second guide shaft that guides movement of the movement member may be provided.

A lens device according to a fourteenth aspect of the present disclosed technology comprises the lens mechanism according to any one of the first to thirteenth aspects, a tilt mechanism that tilts the lens mechanism, a shift mechanism that shifts the lens mechanism, and a rotation mechanism that rotates at least one of the tilt mechanism or the shift mechanism around the optical axis direction.

DESCRIPTION OF THE PREFERRED EMBODIMENTS

In the description of the present specification, the meaning of "being orthogonal" includes not only "being completely orthogonal" but also "being orthogonal with an error generally acceptable in a technical field to which the present disclosed technology belongs to an extent that is not inconsistent with the gist of the present disclosed technology". In the description of the present specification, the meaning of "being parallel with each other" includes not only "being completely parallel with each other" but also "being parallel with each other with an error generally acceptable in a technical field to which the present disclosed technology belongs to an extent that is not inconsistent with the gist of the present disclosed technology". In the description of the present specification, the meaning of "being at equal intervals" includes not only "being at equal intervals" but also "being at equal intervals with an error generally acceptable in a technical field to which the present disclosed technology belongs to an extent that is not inconsistent with the gist of the present disclosed technology".

First, the configuration of an imaging apparatus 10 according to an embodiment of the present disclosure will be described.

Figure 1:
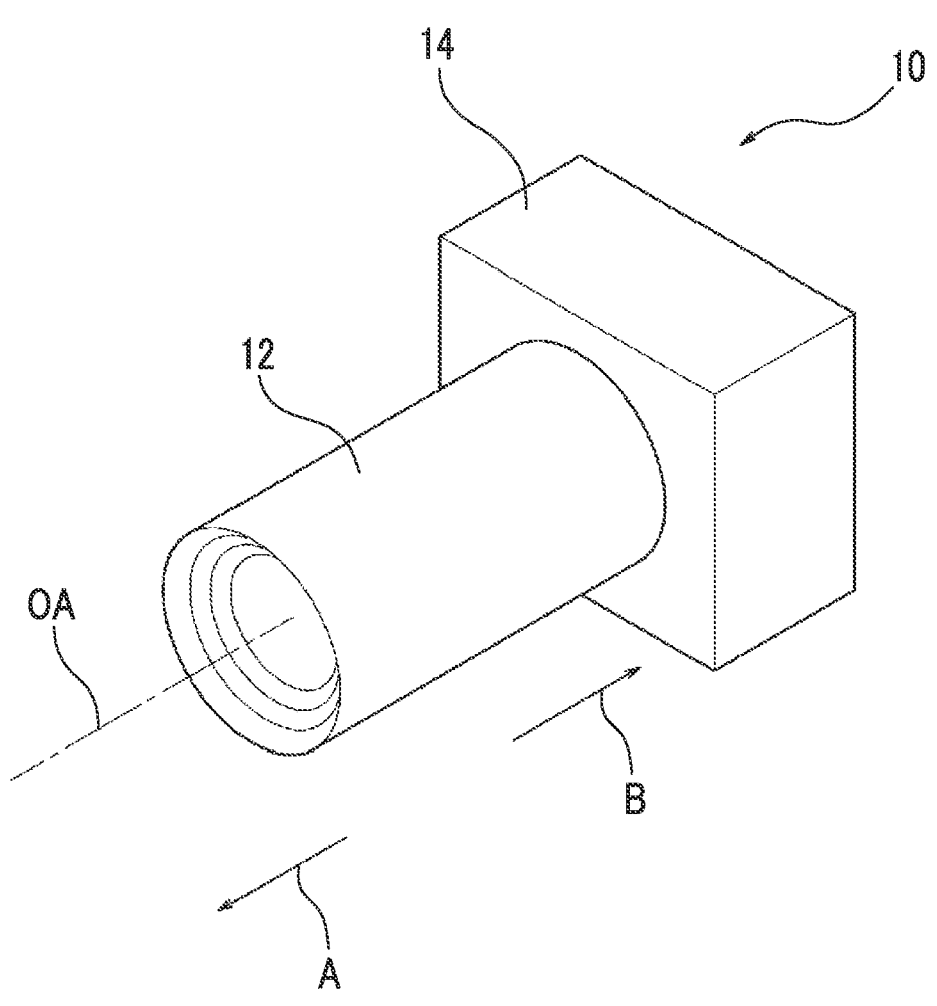
FIG. 1 is a perspective view showing an example of an imaging apparatus.

FIG. 1 shows a perspective view of the imaging apparatus 10 according to the present embodiment. For example, the imaging apparatus 10 includes a lens device 12 and an imaging apparatus body 14 as shown in FIG. 1. The lens device 12 is provided at a front portion of the imaging apparatus body 14. In FIG. 1, the lens device 12 and the imaging apparatus body 14 are schematically shown. An image sensor (not shown), a computer (not shown), and the like are built into the imaging apparatus body 14. Regarding the lens device 12, an arrow A side is an object side, and an arrow B side is an image formation side. An optical axis OA is an optical axis of the lens device 12. Hereinafter, an axial direction along the optical axis OA will be referred to as an "optical axis direction".

Figure 2:
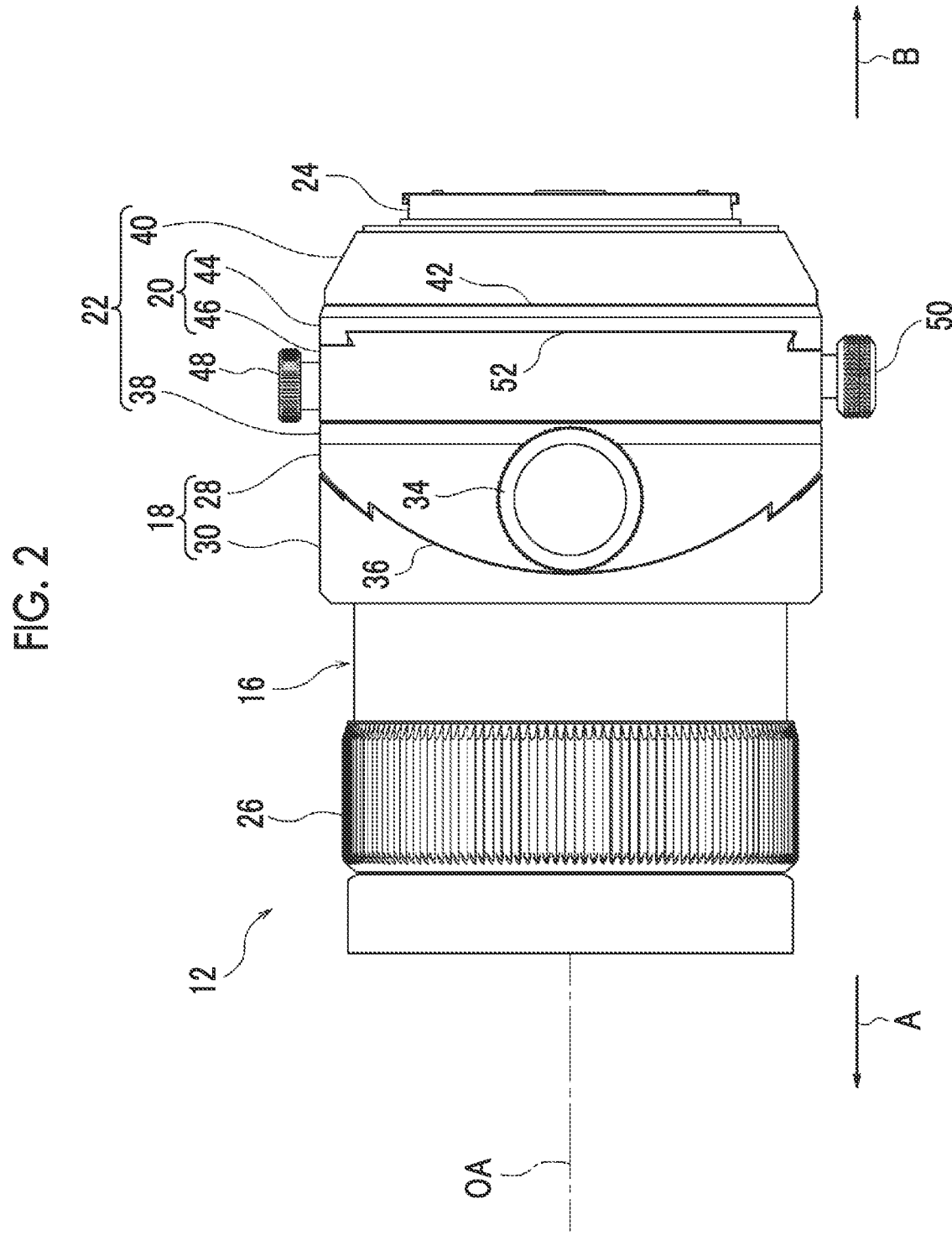
FIG. 2 is a plan view showing an example of a lens device.
Figure 3:
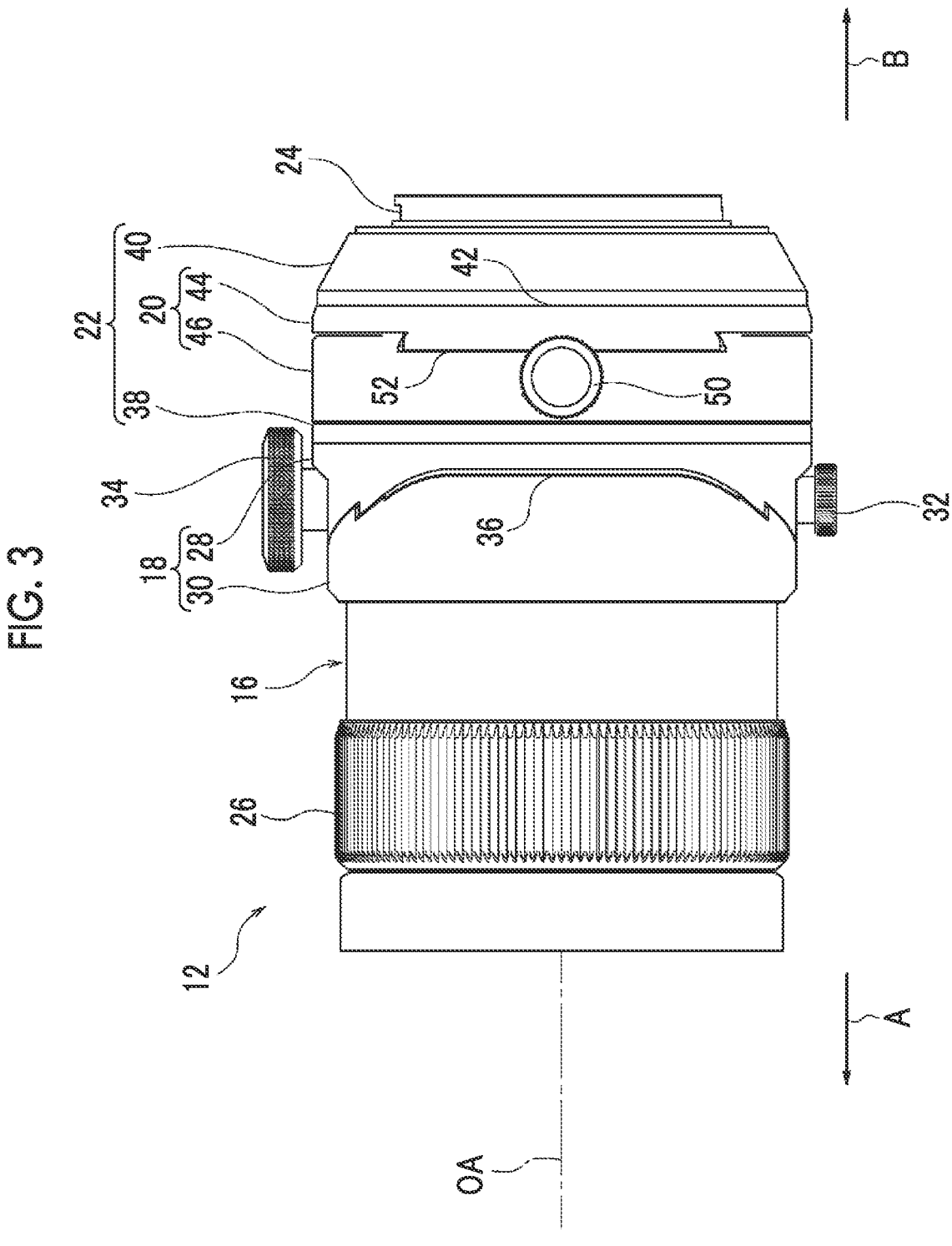
FIG. 3 is a side view showing an example of the lens device.
Figure 4:
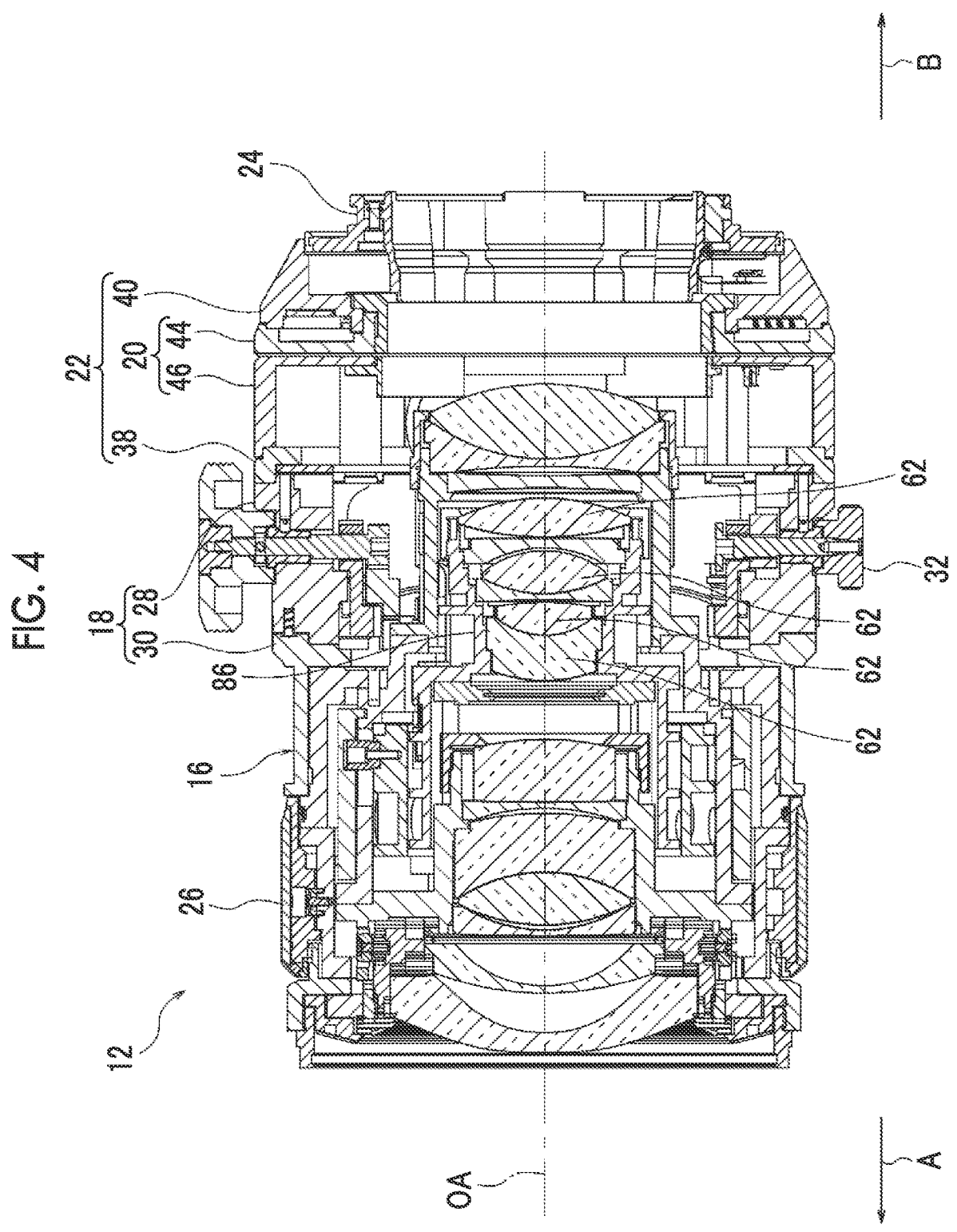
FIG. 4 is a longitudinal cross-sectional view showing an example of the lens device.

FIG. 2 shows a plan view of the lens device 12 and FIG. 3 shows a side view of the lens device 12. In addition, FIG. 4 shows a longitudinal cross-sectional view (that is, a cross-sectional side view) of the lens device 12. For example, as shown in FIGS. 2 to 4, the lens device 12 includes a lens mechanism 16, a tilt mechanism 18, a shift mechanism 20, a revolving mechanism 22, and a mount 24.

The lens mechanism 16 includes a focus ring 26. The focus ring 26 is formed around the optical axis direction in a ring-like shape. The focus ring 26 can rotate around the optical axis direction.

The tilt mechanism 18 is a mechanism that tilts the lens mechanism 16. The tilt mechanism 18 includes a tilt base 28, a tilt stage 30, a tilt lock 32, and a tilt knob 34. A boundary 36 is a boundary between the tilt base 28 and the tilt stage 30. The boundary 36 is formed in an arc-like shape while being centered on a tilt shaft (not shown) orthogonal to the optical axis OA. The tilt mechanism 18 acts with the boundary 36 as a starting point.

The tilt stage 30 is disposed closer to the object side than the tilt base 28 is. The tilt stage 30 is fixed to the lens mechanism 16. The tilt base 28 supports the tilt stage 30 such that the tilt stage 30 can tilt. The meaning of "to tilt" is an operation of rotationally moving about the tilt shaft. The tilt stage 30 tilts integrally with the lens mechanism 16.

The tilt lock 32 and the tilt knob 34 are shaft-shaped members. The tilt lock 32 is disposed with an axial direction of the tilt lock 32 being parallel with an axial direction of the tilt shaft. Similarly, the tilt knob 34 is disposed with an axial direction of the tilt knob 34 being parallel with the axial direction of the tilt shaft. The tilt lock 32 and the tilt knob 34 are provided at the tilt base 28.

The tilt lock 32 is a member that can switch between a locking state in which the tilt stage 30 is fixed to the tilt base 28 and an unlocking state in which the tilt stage 30 is allowed to tilt. The tilt knob 34 is a member that tilts the tilt stage 30. For example, a rack-and-pinion mechanism (not shown) is provided between the tilt knob 34 and the tilt stage 30 and the tilt stage 30 tilts by an amount corresponding to the amount of rotation of the tilt knob 34.

The revolving mechanism 22 is a mechanism that rotates the lens mechanism 16, the tilt mechanism 18, and the shift mechanism 20. The revolving mechanism 22 includes a revolving stage 38 and a revolving base 40. A boundary 42 is a boundary between the revolving base 40 and a shift base 44 which will be described later. The boundary 42 is formed along a plane orthogonal to the optical axis OA. The revolving mechanism 22 acts with the boundary 42 as a starting point.

The revolving stage 38 is disposed closer to the image formation side than the tilt base 28 is. The revolving stage 38 is fixed to the tilt base 28. The revolving base 40 is disposed closer to the image formation side than the shift base 44 is. The revolving base 40 supports the shift base 44 to be rotatable around the optical axis direction. The lens mechanism 16, the tilt mechanism 18, the revolving stage 38, and the shift mechanism 20 integrally rotate with each other around the optical axis direction. The lens mechanism 16, the tilt mechanism 18, the revolving stage 38, and the shift mechanism 20 rotate in a case where a force in a rotation direction is applied by a user or the like. The revolving mechanism 22 is an example of a "rotation mechanism" according to an embodiment of the present disclosed technology.

The shift mechanism 20 is a mechanism that shifts the lens mechanism 16 and the tilt mechanism 18. The shift mechanism 20 includes the shift base 44, a shift stage 46, a shift lock 48, and a shift knob 50. A boundary 52 is a boundary between the shift base 44 and the shift stage 46. The boundary 52 is formed along a plane orthogonal to the optical axis OA. The shift mechanism 20 acts with the boundary 52 as a starting point.

The shift stage 46 is disposed closer to the image formation side than the revolving stage 38 is. The shift stage 46 is fixed to the revolving stage 38. The shift base 44 is disposed closer to the image formation side than the shift stage 46 is. The shift base 44 supports the shift stage 46 such that the shift stage 46 can shift. The meaning of "to shift" is an operation of sliding in a direction orthogonal to the optical axis direction. The shift stage 46 integrally shifts with the lens mechanism 16, the tilt mechanism 18, and the revolving stage 38. For example, a direction in which the shift stage 46 shifts (hereinafter, referred to as a "shift direction") is set to a vertical direction of the imaging apparatus 10 (refer to FIG. 1).

The shift lock 48 and the shift knob 50 are shaft-shaped members. The shift lock 48 is disposed with an axial direction of the shift lock 48 being parallel with a direction orthogonal to the optical axis direction and the shift direction. Similarly, the shift knob 50 is disposed with an axial direction of the shift knob 50 being parallel with the direction orthogonal to the optical axis direction and the shift direction. The shift lock 48 and the shift knob 50 are provided at the shift stage 46.

The shift lock 48 is a member that can switch between a locking state in which the shift stage 46 is fixed to the shift base 44 and an unlocking state in which the shift stage 46 is allowed to shift. The shift knob 50 is a member that shifts the shift stage 46. For example, a rack-and-pinion mechanism (not shown) is provided between the shift knob 50 and the shift base 44 and the shift stage 46 shifts by an amount corresponding to the amount of rotation of the shift knob 50.

The mount 24 is provided at an end portion of the lens mechanism 16 that is on the image formation side. The mount 24 is fixed to the revolving base 40. The mount 24 is attached to a mount (not shown) provided on the imaging apparatus body 14 (refer to FIG. 1). The lens device 12 is fixed to the front portion of the imaging apparatus body 14 in a case where the mount 24 is fixed to the mount provided on the imaging apparatus body 14.

Figure 5:
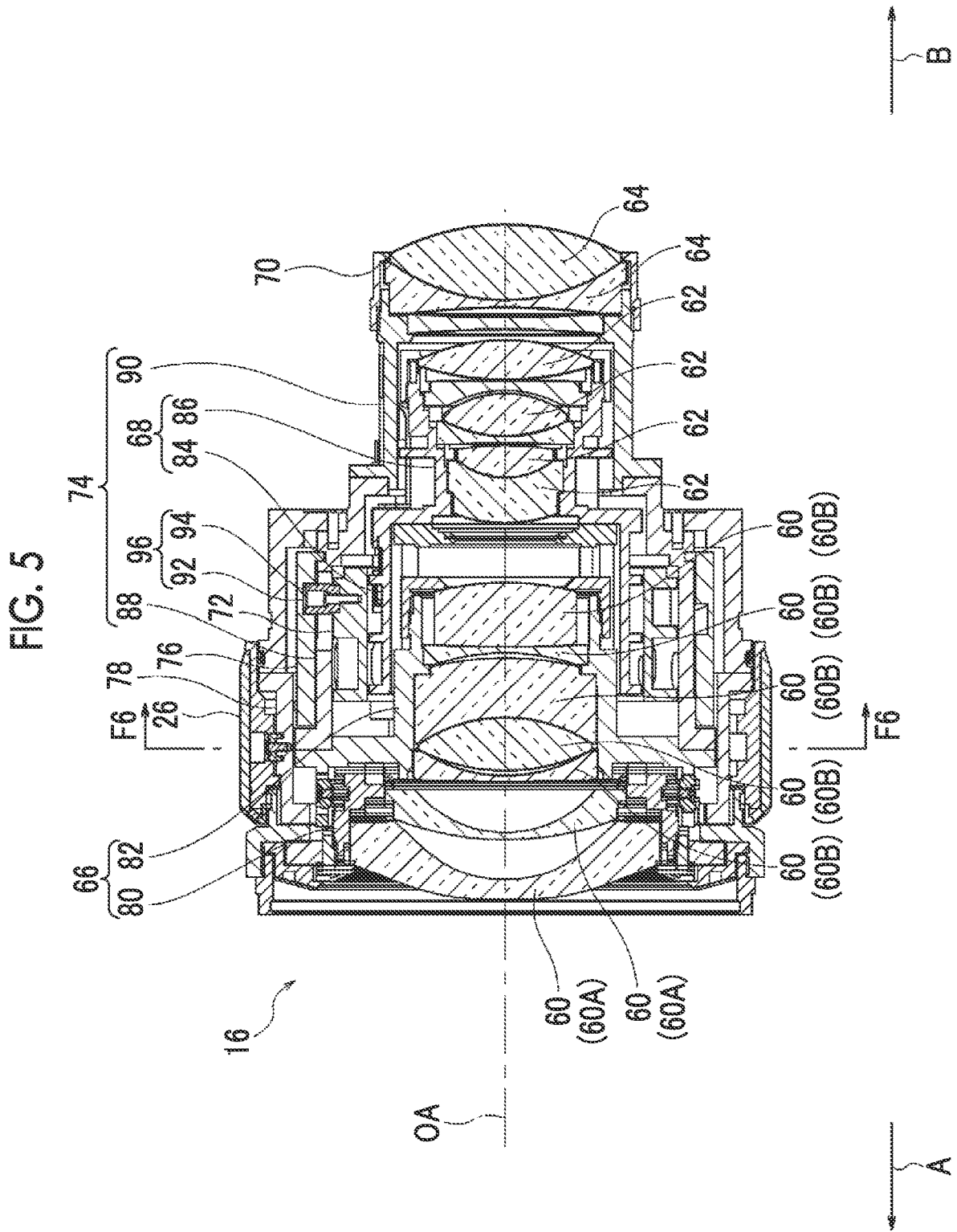
FIG. 5 is a longitudinal cross-sectional view showing an example of a lens mechanism.

FIG. 5 shows a longitudinal cross-sectional view of the lens mechanism 16. For example, as shown in FIG. 5, the lens mechanism 16 includes first lenses 60, second lenses 62, third lenses 64, a first lens frame 66, a second lens frame 68, a third lens frame 70, a movement frame 72, a fixation member 74, a cam tube 76, a rotary tube 78, and a focus ring 26.

For example, the first lenses 60 are objective lenses, the second lenses 62 are focus lenses, and the third lenses 64 are fixed focal lenses. The first lenses 60 are disposed closer to the object side than the second lenses 62 are and the third lenses 64 are disposed closer to the image formation side than the second lenses 62 are. The first lenses 60 are examples of an "objective lens" according to an embodiment of the present disclosed technology. The second lenses 62 are examples of a "lens" and a "focus lens" according to an embodiment of the present disclosed technology.

The first lenses 60 are disposed inside the first lens frame 66, the second lenses 62 are disposed inside the second lens frame 68, and the third lenses 64 are disposed inside the third lens frame 70. In the present specification, the term "inside" means "inside in a radial direction" unless there is no description in which a direction is specified. The first lens frame 66 holds the first lenses 60, the second lens frame 68 holds the second lenses 62, and the third lens frame 70 holds the third lenses 64. The second lens frame 68 is an example of a "lens holding member" according to an embodiment of the present disclosed technology.

The first lens frame 66 includes a first frame 80 and a second frame 82. The first frame 80 is provided closer to the object side than the second frame 82 is. Lenses 60A, which are part of the first lenses 60 and are positioned on the object side, are disposed inside the first frame 80 and lenses 60B, which is part of the first lenses 60 and are positioned on the image formation side, are disposed inside the second frame 82.

The second lens frame 68 includes a third frame 84 and a fourth frame 86. The third frame 84 is provided closer to the object side than the fourth frame 86 is. The second lenses 62 are disposed inside the fourth frame 86. The second lenses 62 and the fourth frame 86 are disposed inside the tilt mechanism 18, the shift mechanism 20, and the revolving mechanism 22 (refer to FIG. 4).

The third frame 84 is disposed closer to the object side than the second lenses 62 are. In addition, the third frame 84 is disposed outside the second frame 82 of the first lens frame 66. In the present specification, the term "outside" means "outside in the radial direction" unless there is no description in which a direction is specified. The lenses 60B, which are part of the first lenses 60 and are positioned on the image formation side, are disposed inside the third frame 84. The lenses 60B, which are part of the first lenses 60 and are positioned on the image formation side, are examples of "at least a portion of the objective lens" according to an embodiment of the present disclosed technology. The third frame 84 is an example of a "connection member" according to an embodiment of the present disclosed technology.

The movement frame 72 is connected to an outer side of the third frame 84. The movement frame 72 is formed of, for example, a resin. The fixation member 74 includes a fixation frame 88 and a connection frame 90. The fixation frame 88 is provided closer to the object side than the connection frame 90 is. The fixation frame 88 is disposed outside the movement frame 72. The third lens frame 70 is fixed to an end portion of the connection frame 90 that is on the image formation side. The fourth frame 86 and the second lenses 62 are disposed inside the connection frame 90. The fixation member 74 is fixed to the first lens frame 66. The fixation frame 88 of the fixation member 74 is an example of a "fixation member" according to an embodiment of the present disclosed technology. The movement frame 72 is an example of a "movement member" according to an embodiment of the present disclosed technology.

The cam tube 76 is disposed outside the movement frame 72 and the fixation frame 88. The rotary tube 78 is connected to an outer side of the cam tube 76 and the focus ring 26 is connected to an outer side of the rotary tube 78. The cam tube 76 is an example of a "cam tube" according to an embodiment of the present disclosed technology. The focus ring 26 is an example of an "operation ring" according to an embodiment of the present disclosed technology.

The focus ring 26, the rotary tube 78, and the cam tube 76 are supported to be rotatable around the optical axis direction with respect to the fixation member 74. In addition, the movement frame 72 and the second lens frame 68 are supported to be movable in the optical axis direction with respect to the fixation member 74.

The movement frame 72 is provided with cam shafts 92. The cam shafts 92 are shaft-shaped members extending from the movement frame 72 toward the cam tube 76. The fixation frame 88 is provided between the movement frame 72 and the cam tube 76. The cam shafts 92 penetrate the fixation frame 88 and protrude toward the cam tube 76 side with respect to the fixation frame 88. Cam grooves 94 are formed at a surface (that is, an inner peripheral surface) of the cam tube 76 that is on the fixation frame 88 side. The cam grooves 94 are formed along a spiral extending in the optical axis direction. The cam shafts 92 are engaged with the cam grooves 94.

The cam shafts 92 and the cam grooves 94 form cam mechanisms 96 that convert a force acting around the optical axis direction into a force in the optical axis direction. In a case where the focus ring 26 is operated in the rotation direction by a user or the like, the cam shafts 92 move along the cam grooves 94 as the focus ring 26 and the cam tube 76 rotate, so that the movement frame 72 and the second lens frame 68 move in the optical axis direction. The cam shafts 92 are examples of a "cam shaft" according to an embodiment of the present disclosed technology. The cam grooves 94 are examples of a "cam groove" according to an embodiment of the present disclosed technology.

Note that although one cam mechanism 96 is shown in FIG. 5, the lens device 12 is provided with three cam mechanisms 96. That is, the number of a plurality of the cam shafts 92 is three. The three cam shafts 92 are disposed around the optical axis direction at equal intervals. The cam grooves 94 of the three cam mechanisms 96 may be independent of each other or may be connected to each other.

Figure 6:
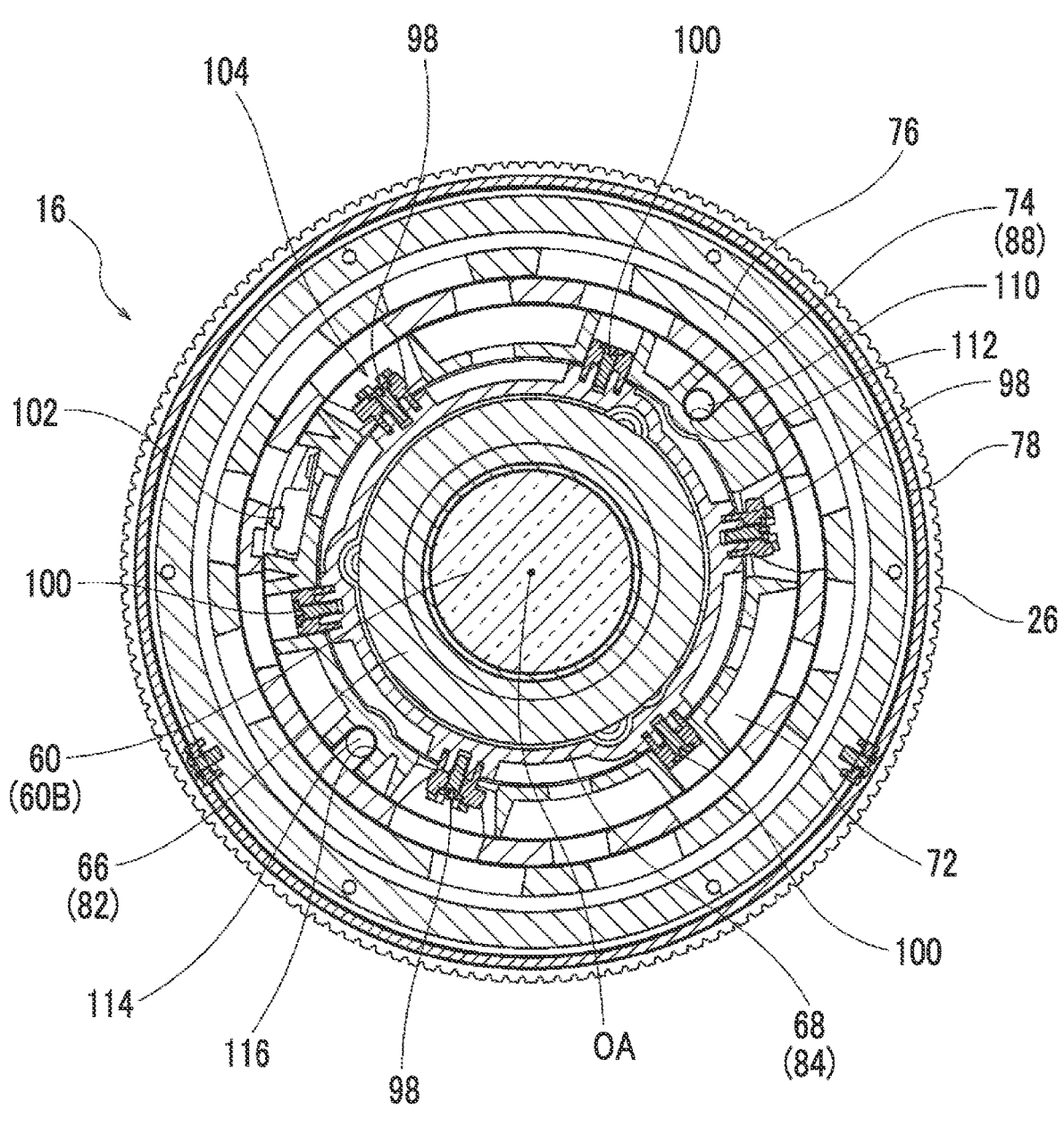
FIG. 6 is a cross-sectional view taken along line F6-F6 in FIG. 5.
Figure 7:
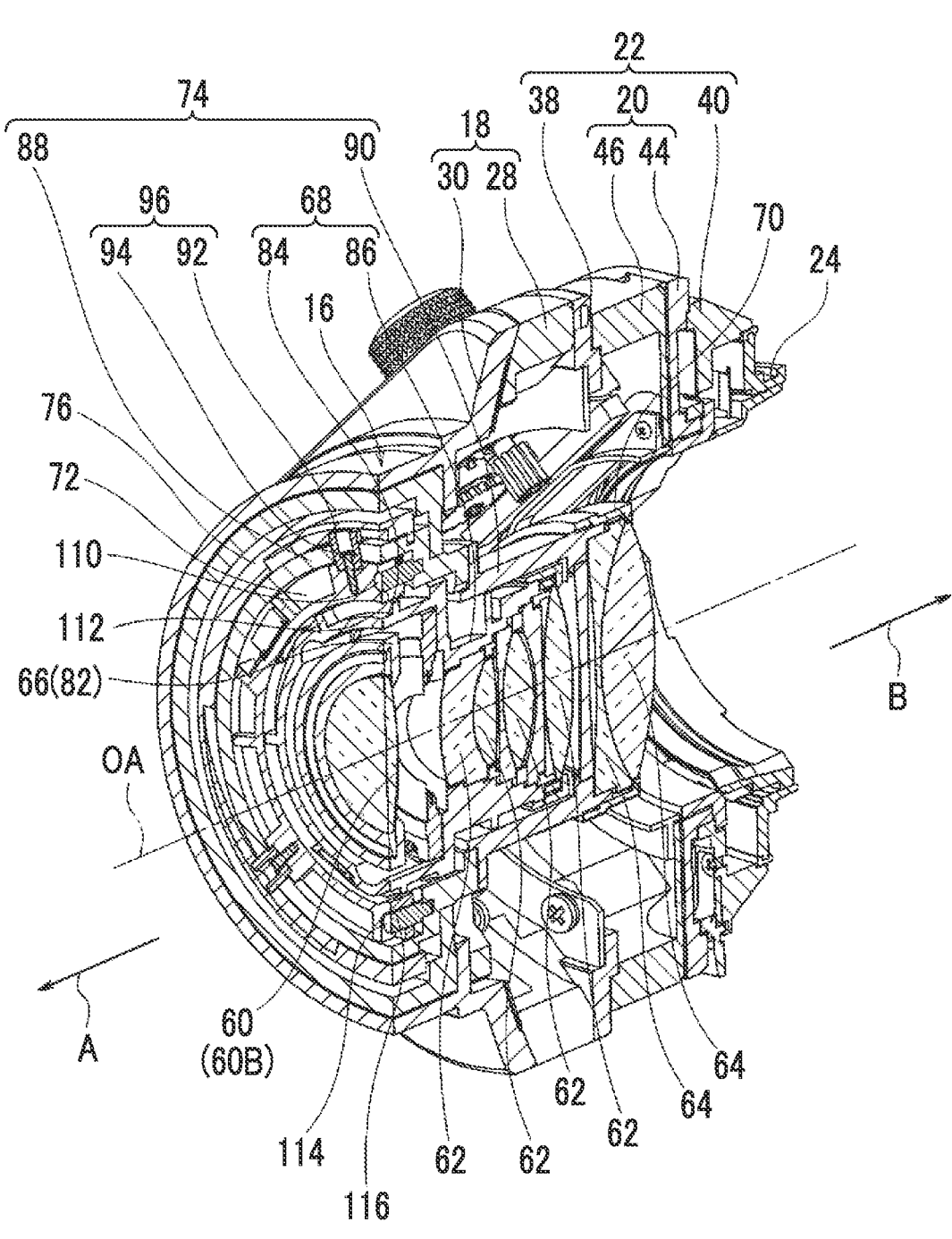
FIG. 7 is a perspective view in which a section of a portion of the lens device is also shown.
Figure 8:
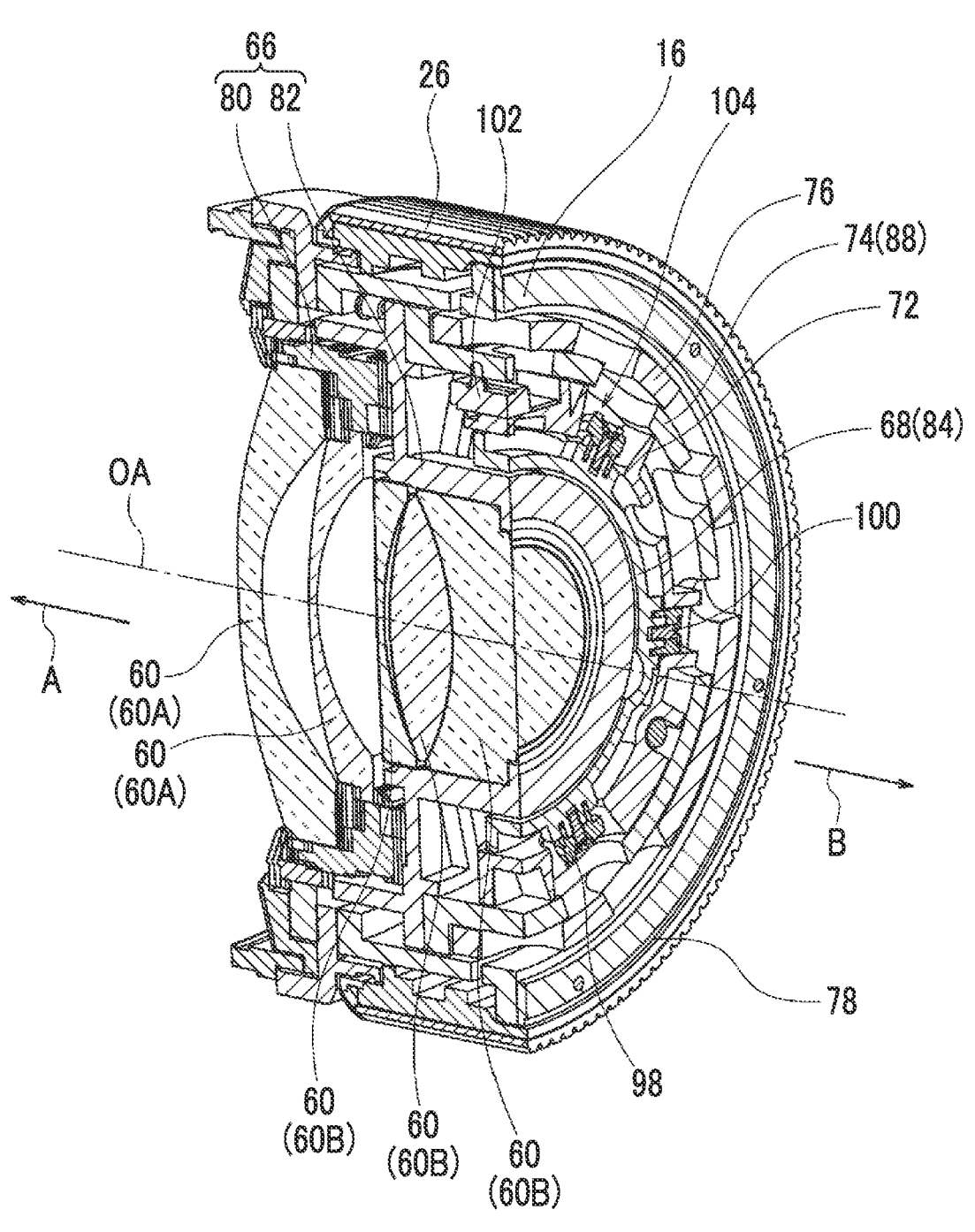
FIG. 8 is a perspective view in which a section of a portion of the lens device is also shown.

FIG. 6 shows a cross-sectional view of the lens device 12 which is taken along line F6-F6 in FIG. 5. In addition, FIG. 7 and FIG. 8 show perspective views of the lens device 12 in each of which a section of a portion of the lens device 12 is also shown. FIG. 8 is a perspective view as seen at an angle different from FIG. 7.

For example, as shown in FIGS. 6 to 8, the lens mechanism 16 includes a plurality of lens adjustment shafts 98, a plurality of tilt-shift guides 100, and a sensor 102. The lens adjustment shafts 98 are members that adjust the angle (that is, the tilt-shift angle) of the second lens frame 68 with respect to the optical axis OA and the tilt-shift guides 100 are members that guide adjustment of the angle of the second lens frame 68. Specific configurations of the lens adjustment shafts 98 and the tilt-shift guides 100 will be described later. The sensor 102 is a sensor that detects the position of the movement frame 72 in the optical axis direction. Examples of the sensor 102 include a linear sensor such as a resistance type displacement sensor which uses a resistor element, a magnetic type displacement sensor composed of a combination of a giant magneto resistive (GMR) sensor and a magnetization sheet, and an optical type displacement sensor which uses a diffraction grating and an optical pickup.

For example, the number of a plurality of the lens adjustment shafts 98 is three. Similarly, the number of a plurality of the tilt-shift guides 100 is also three. The three lens adjustment shafts 98 are disposed around the optical axis direction at equal intervals. Similarly, the three tilt-shift guides 100 are also disposed around the optical axis direction at equal intervals. The lens adjustment shafts 98 and the tilt-shift guides 100 are alternately disposed in a direction around the optical axis direction (that is, a circumferential direction of the lens mechanism 16). Each of the tilt-shift guides 100 is disposed between adjacent lens adjustment shafts 98.

The three lens adjustment shafts 98 and the three tilt-shift guides 100 constitute an adjustment mechanism 104 of the second lens frame 68. The movement frame 72 is connected to an outer side of the second lens frame 68 (specifically, the third frame 84) by the adjustment mechanism 104. The adjustment mechanism 104 is disposed closer to the object side than the fourth frame 86 and the second lenses 62 (refer to FIG. 5) are. In addition, the plurality of lens adjustment shafts 98, the plurality of tilt-shift guides 100, and the sensor 102 are disposed inside the fixation frame 88.

The adjustment mechanism 104 is an example of an "adjustment mechanism of a lens holding member" according to an embodiment of the present disclosed technology. The lens adjustment shafts 98 are examples of an "adjustment member" according to an embodiment of the present disclosed technology. The tilt-shift guides 100 are examples of a "guide member" according to an embodiment of the present disclosed technology. The sensor 102 is an example of a "sensor" according to an embodiment of the present disclosed technology.

The lens mechanism 16 includes a first guide shaft 110, a first bearing 112, a second guide shaft 114, and a second bearing 116. The first guide shaft 110 and the second guide shaft 114 are formed in a pin-like shape and extend in the optical axis direction. The first guide shaft 110 and the second guide shaft 114 are provided at the fixation frame 88. The second guide shaft 114 is disposed on a side opposite to the first guide shaft 110 (that is, the opposite side to the first guide shaft 110) with the optical axis OA interposed therebetween. The first guide shaft 110 and the second guide shaft 114 are formed of, for example, metal.

The first bearing 112 and the second bearing 116 are formed at the movement frame 72. That is, the movement frame 72 includes the first bearing 112 and the second bearing 116. The first bearing 112 is formed in a hole-like shape extending in the optical axis direction. The second bearing 116 is formed in a shape resembling a U-shaped groove extending in the optical axis direction. A bottom portion of the shape of the second bearing 116 which resembles a U-shaped groove is positioned closer to the optical axis OA side (that is, an inner side in the lens mechanism 16 in the radial direction) than the second guide shaft 114 is and an open portion of the shape of the second bearing 116 which resembles a U-shaped groove is positioned closer to a side opposite to the optical axis OA side (that is, an outer side in the lens mechanism 16 in the radial direction) than the second guide shaft 114 is.

The first guide shaft 110 is inserted into the first bearing 112 and the second guide shaft 114 is inserted into the second bearing 116. The movement of the movement frame 72 in the optical axis direction is guided since the first guide shaft 110 is inserted into the first bearing 112 and the second guide shaft 114 is inserted into the second bearing 116. The first guide shaft 110 is an example of a "guide shaft" and a "first guide shaft" according to an embodiment of the present disclosed technology. The second guide shaft 114 is an example of a "second guide shaft" according to an embodiment of the present disclosed technology. The first bearing 112 is an example of a "bearing" according to an embodiment of the present disclosed technology.

Figure 9:
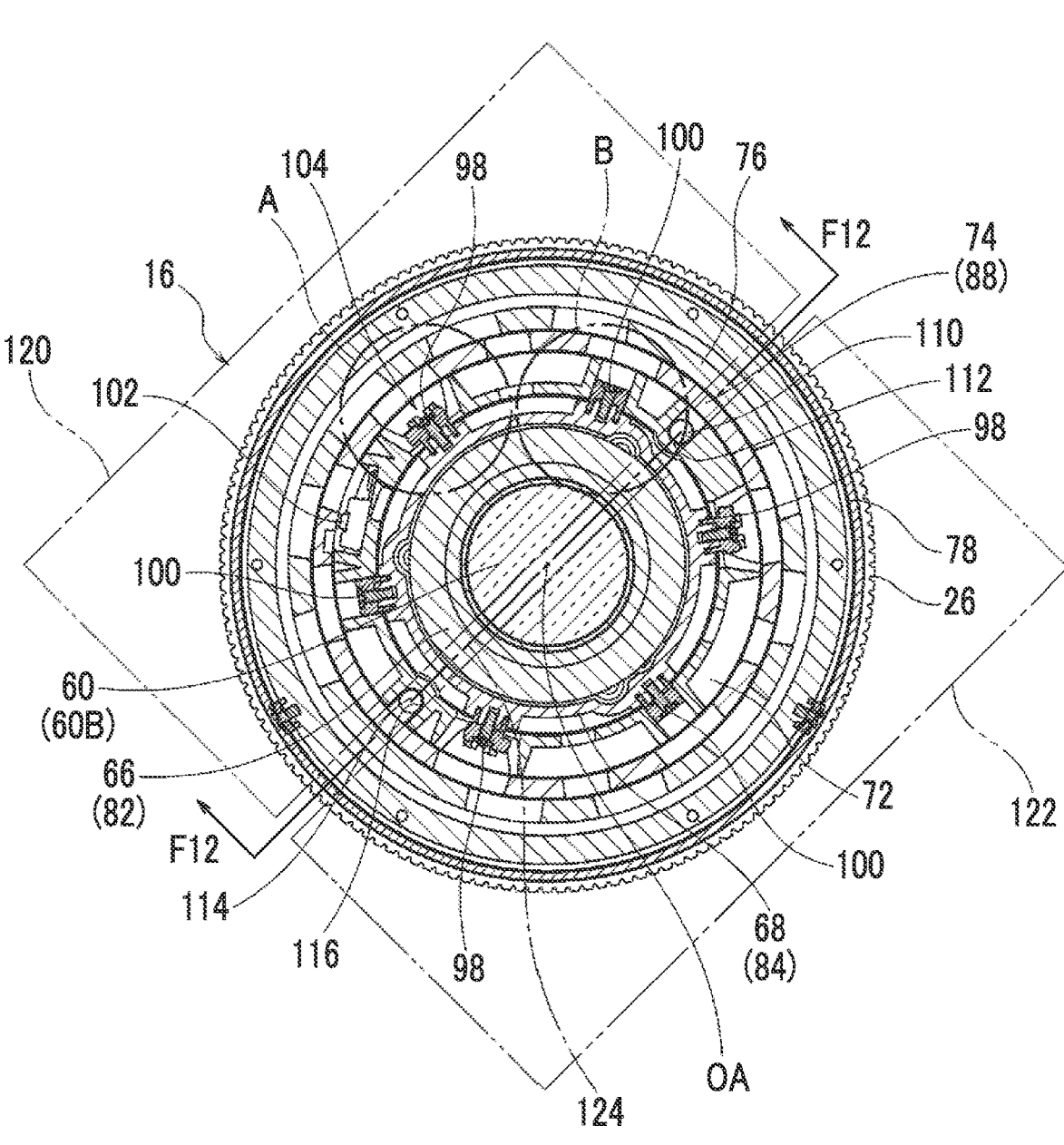
FIG. 9 is a cross-sectional view showing an example of a first region and a second region of the lens mechanism.

FIG. 9 shows the lens mechanism 16 divided into a first region 120 and a second region 122. FIG. 9 is a cross-sectional view of the lens mechanism 16 cut at the same position as in the case of FIG. 6. For example, as shown in FIG. 9, the first region 120 and the second region 122 are regions separated from each other by a line segment 124 connecting the first guide shaft 110 and the second guide shaft 114 to each other. In the first region 120, one of the three lens adjustment shafts 98 and two of the three tilt-shift guides 100 are disposed. In the second region 122, two of the three lens adjustment shafts 98 and one of the three tilt-shift guides 100 are disposed.

For example, the sensor 102 is disposed in the first region 120. The sensor 102 is disposed between the lens adjustment shaft 98 and the tilt-shift guide 100 in the circumferential direction of the lens mechanism 16. The sensor 102 is disposed in a region closer to the second guide shaft 114 than to the first guide shaft 110.

Figure 10:
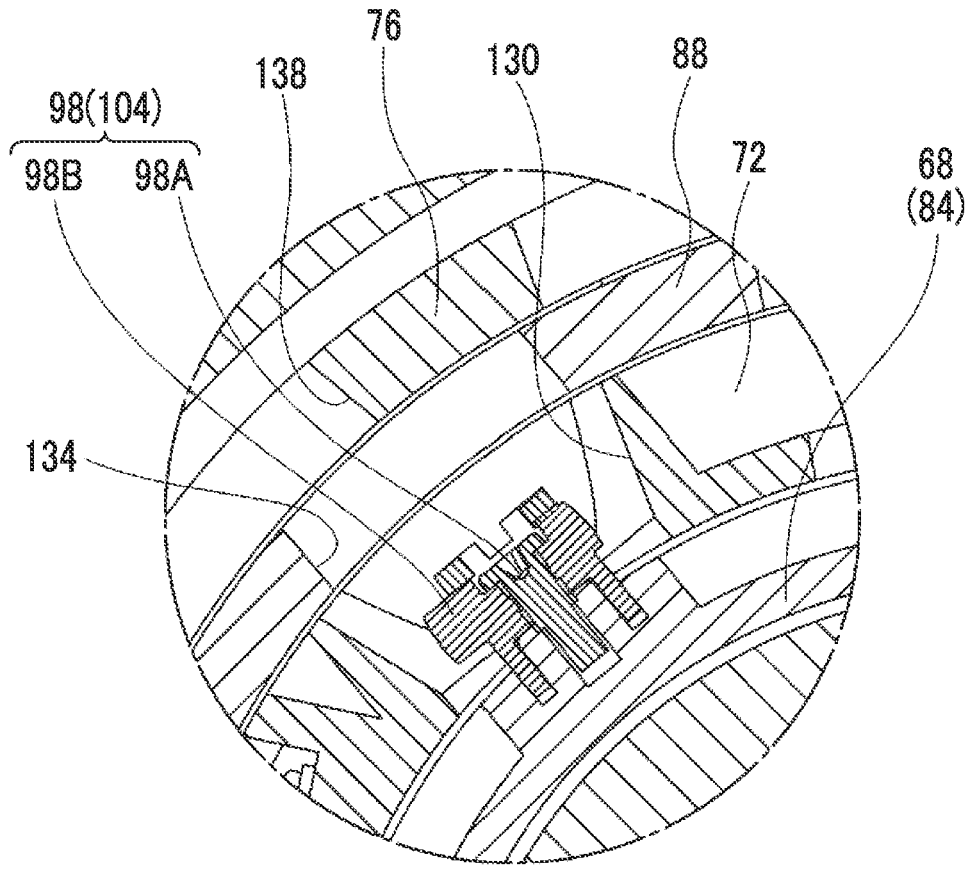
FIG. 10 is an enlarged view of part A of FIG. 9.
Figure 11:
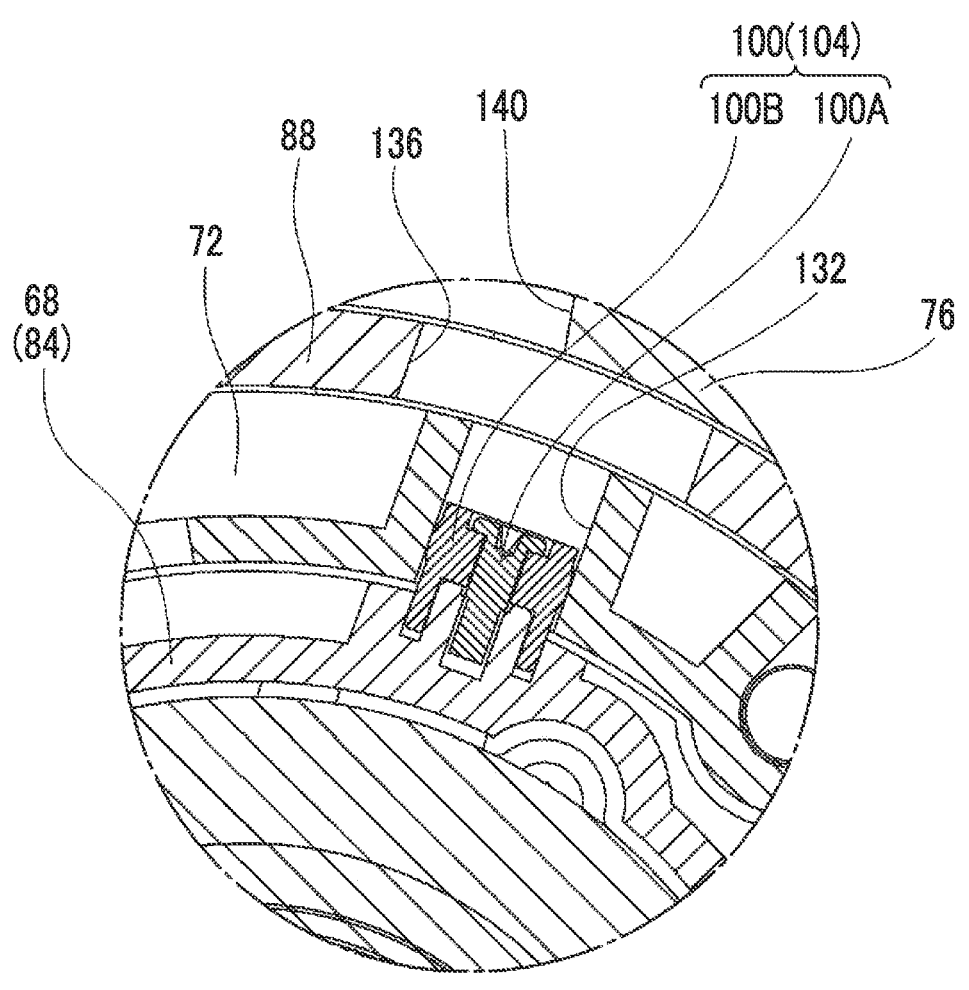
FIG. 11 is an enlarged view of part B of FIG. 9.

FIG. 10 shows an enlarged view of part A of FIG. 9 and FIG. 11 shows an enlarged view of part B of FIG. 9. For example, as shown in FIGS. 10 and 11, the movement frame 72 includes openings 130 and openings 132 formed at positions corresponding to the adjustment mechanism 104. The openings 130 are formed at positions corresponding to the lens adjustment shafts 98 and the openings 132 are formed at positions corresponding to the tilt-shift guides 100. The fixation frame 88 includes openings 134 and openings 136 formed at positions corresponding to the adjustment mechanism 104. The openings 134 are formed at positions corresponding to the lens adjustment shafts 98 and the openings 136 are formed at positions corresponding to the tilt-shift guides 100. The cam tube 76 includes openings 138 and openings 140 formed at positions corresponding to the adjustment mechanism 104. The openings 138 are formed at positions corresponding to the lens adjustment shafts 98 and the openings 140 are formed at positions corresponding to the tilt-shift guides 100.

Each of the lens adjustment shafts 98 includes a support member 98A and a rotary member 98B. The support member 98A is fixed to the third frame 84 of the second lens frame 68. The support member 98A is a shaft-shaped member extending to the outside of the third frame 84. The rotary member 98B is rotatably supported by the support member 98A. The rotary member 98B has a shape eccentric with respect to the central axis of the support member 98A. The rotary member 98B is accommodated in the opening 130 formed in the movement frame 72, and is in contact with an inner peripheral surface of the opening 130. A distance between the center of rotation of the rotary member 98B and the inner peripheral surface of the opening 130 is changed in accordance with the angle of rotation of the rotary member 98B so that the angle of the second lens frame 68 is adjusted.

Each of the tilt-shift guides 100 includes a support member 100A and a guide member 100B. The support member 100A is fixed to the third frame 84 of the second lens frame 68. The support member 100A is a shaft-shaped member extending to the outside of the third frame 84. The guide member 100B is fixed to the support member 100A. The guide member 100B is accommodated in the opening 132 (that is, a groove) formed in the movement frame 72. The guide member 100B is engaged with the opening 132 to be movable in the optical axis direction. With the guide member 100B being guided by the opening 132, adjustment of the angle of the second lens frame 68 is guided.

Figure 12:
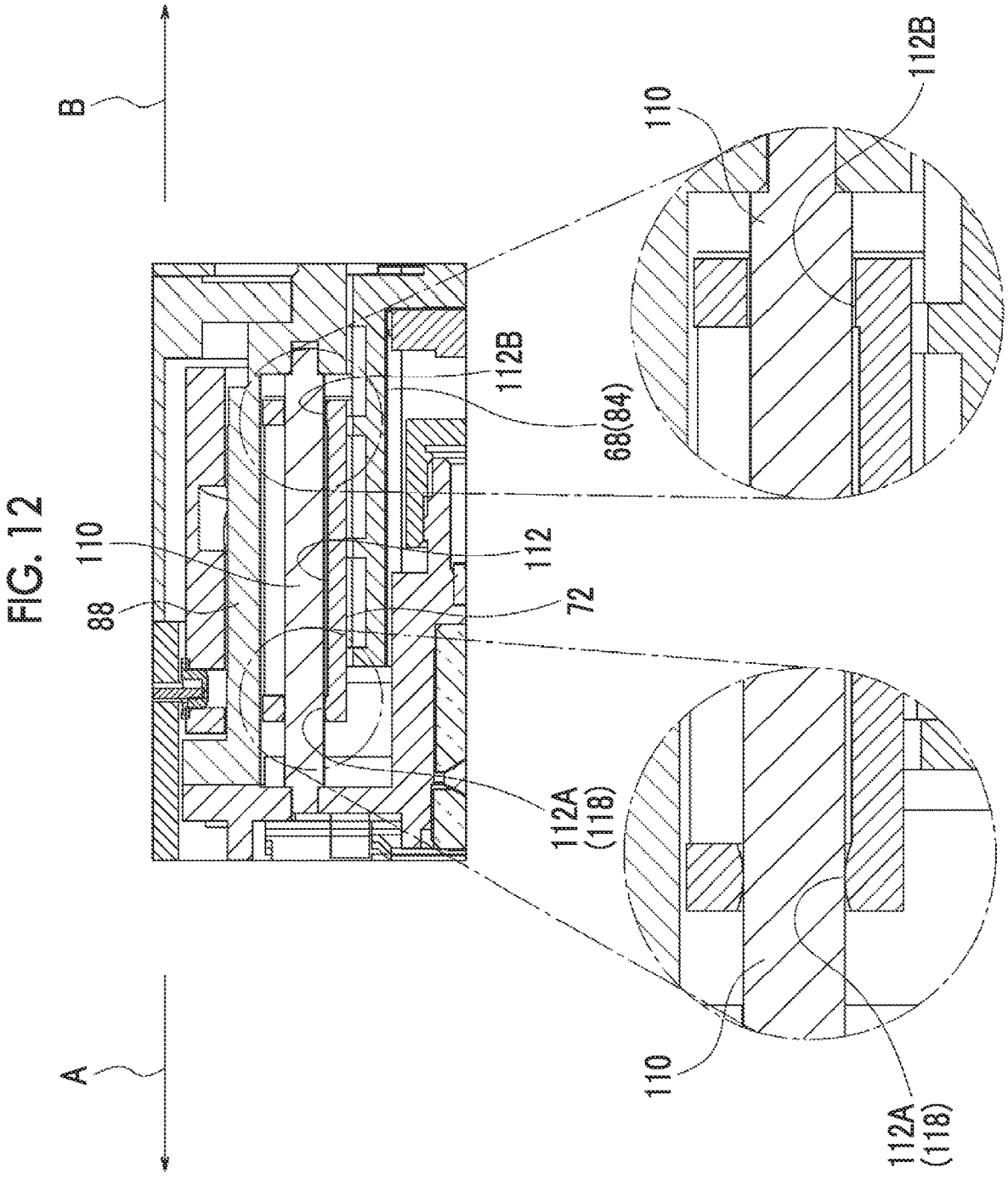
FIG. 12 is a cross-sectional view showing an example of the vicinity of a first guide shaft and a first bearing.

FIG. 12 shows a cross-sectional view of the vicinity of the first guide shaft 110 and the first bearing 112 which is taken along line F12-F12 of FIG. 9. For example, as shown in FIG. 12, the first bearing 112 includes a first portion 112A and a second portion 112B. FIG. 12 shows enlarged views of the first portion 112A and the second portion 112B. For example, the first portion 112A is positioned on a first side of the first bearing 112, and the second portion 112B is positioned on a second side of the first bearing 112. The first side is a first side in an axial direction of the first bearing 112, and the second side is a second side in the axial direction of the first bearing 112. For example, the first side is the object side and the second side is the image formation side. The first portion 112A comes into contact with the first guide shaft 110, and the first guide shaft 110 is movably inserted into the second portion 112B. The first portion 112A includes a protrusion portion 118 that comes into contact with the first guide shaft 110.

The protrusion portion 118 is formed in a convexly curved planar shape as seen in a longitudinal cross-sectional view and comes into contact with an outer peripheral surface of the first guide shaft 110. As shown in FIG. 12, a longitudinal cross section is a cross section cut along a height direction of the protrusion portion 118. The protrusion portion 118 is formed along a circumferential direction of the first guide shaft 110. For example, the protrusion portion 118 is formed in an annular shape along the circumferential direction of the first guide shaft 110. The protrusion portion 118 is formed in a convexly curved planar shape as seen in a longitudinal cross-sectional view and is formed along the circumferential direction of the first guide shaft 110, so that the protrusion portion 118 comes into contact with the outer peripheral surface of the first guide shaft 110.

For example, the second portion 112B is separated from the first guide shaft 110 by a distance that is equal to or greater than 0.2% of the diameter of the first guide shaft 110 and is equal to or smaller than 0.6% of the diameter of the first guide shaft 110. Note that the second portion 112B has a function of maintaining the posture of the movement frame 72 by coming into contact with the first guide shaft 110 as the posture of the movement frame 72 is changed.

The first portion 112A is an example of a "first portion" according to an embodiment of the present disclosed technology. The second portion 112B is an example of a "second portion" according to an embodiment of the present disclosed technology. The object side is an example of a "first side" according to an embodiment of the present disclosed technology. The image formation side is an example of a "second side" according to an embodiment of the present disclosed technology. The protrusion portion 118 is an example of a "protrusion portion" according to an embodiment of the present disclosed technology.

Next, the effects of the present embodiment will be described.

In the lens device 12 according to the present embodiment, the lens mechanism 16 includes the second lens frame 68 that holds the second lenses 62, the movement frame 72 that is connected to the second lens frame 68, the cam tube 76 that is disposed outside the movement frame 72, and the focus ring 26 that is connected to an outer side of the cam tube 76. The movement frame 72 is provided with the cam shafts 92, and the cam tube 76 includes the cam grooves 94 that engage with the cam shafts 92. Therefore, in a case where the focus ring 26 is operated in the rotation direction by a user or the like, the cam shafts 92 move along the cam grooves 94 as the focus ring 26 and the cam tube 76 rotate, so that the movement frame 72 and the second lens frame 68 can be moved in the optical axis direction. Accordingly, a user or the like can focus on a subject manually.

In addition, the number of the plurality of cam shafts 92 is three. Therefore, in a case where the focus ring 26 is operated in the rotation direction by a user or the like, a movement force in the optical axis direction can be applied to the movement frame 72 at three positions at which the three cam shafts 92 are positioned.

In addition, the lens mechanism 16 includes the first guide shaft 110 and the second guide shaft 114 that guide movement of the movement frame 72. Therefore, even in a case where the posture of the cam tube 76 is changed as the focus ring 26 rotates, movement of the movement frame 72 is guided by the first guide shaft 110 and the second guide shaft 114, so that the rattling of the movement frame 72 can be suppressed. Accordingly, the rattling of the second lens frame 68 connected to the movement frame 72 can be suppressed.

In addition, the movement of the movement frame 72 can be guided at two positions at which the first guide shaft 110 and the second guide shaft 114 are positioned. Accordingly, for example, the movement of the movement frame 72 can be stably guided in comparison with a structure in which the movement of the movement frame 72 is guided at one position.

In addition, the movement frame 72 includes the first bearing 112 into which the first guide shaft 110 is inserted. The first bearing 112 includes the first portion 112A and the second portion 112B. The first portion 112A comes into contact with the first guide shaft 110, and the first guide shaft 110 is movably inserted into the second portion 112B. Therefore, for example, it is possible to achieve both of suppression of the rattling of the movement frame 72 and reduction of sliding friction of the movement frame 72 in comparison with a case where the first guide shaft 110 comes into contact with the first bearing 112 over the axial direction.

In addition, the first portion 112A is positioned on the first side of the first bearing 112 in the axial direction, and the second portion 112B is positioned on the second side of the first bearing 112 in the axial direction. Therefore, it is possible to suppress the rattling of the movement frame 72 by means of the first portion 112A and to reduce sliding friction of the movement frame 72 by means of the second portion 112B.

In addition, the first side on which the first portion 112A is positioned is the object side, and the second side on which the second portion 112B is positioned is the image formation side. Here, the object side of the lens device 12 is a free end side, and the image formation side of the lens device 12 is a fixed end side on which the lens device 12 is fixed to the imaging apparatus body 14. Therefore, since the first portion 112A comes into contact with the first guide shaft 110 on the object side on which a stiffness is lower than that on the image formation side, the rattling of the movement frame 72 can be effectively suppressed. That is, the rattling of the movement frame 72 can be suppressed in comparison with a case where the second portion 112B into which the first guide shaft 110 is movably inserted is provided on the object side.

In addition, the first portion 112A includes the protrusion portion 118 that comes into contact with the first guide shaft 110. Therefore, the protrusion portion 118 is in point-contact with the first guide shaft 110 as seen in a longitudinal cross-sectional view of the protrusion portion 118 and thus it is possible to achieve suppression of the rattling of the movement frame 72 and reduction of sliding friction of the movement frame 72 at the first portion 112A as well. That is, it is possible to suppress the rattling of the movement frame 72 and to reduce sliding friction of the movement frame 72 in comparison with a structure in which the first portion 112A comes into surface-contact with the first guide shaft 110 over the axial direction of the first guide shaft 110 (that is, a structure in which the area of contact is larger than that of the protrusion portion 118).

In addition, the protrusion portion 118 is formed along the circumferential direction of the first guide shaft 110. Therefore, the protrusion portion 118 can be brought into line-contact with the first guide shaft 110 along the circumferential direction of the first guide shaft 110. Accordingly, it is possible to suppress the rattling of the movement frame 72 while reducing sliding friction of the movement frame 72 in comparison with a structure in which a plurality of the protrusion portions 118 are scattered in the circumferential direction of the first guide shaft 110, for example.

In addition, the protrusion portion 118 is formed in a convexly curved planar shape as seen in a longitudinal cross-sectional view and comes into contact with an outer peripheral surface of a guide shaft. Accordingly, it is possible to realize a state in which the protrusion portion 118 is in point-contact with the first guide shaft 110 as seen in a longitudinal cross-sectional view of the protrusion portion 118.

In addition, the second portion 112B is separated from the first guide shaft 110 by a distance that is equal to or greater than 0.2% of the diameter of the first guide shaft 110 and is equal to or smaller than 0.6% of the diameter of the first guide shaft 110. Here, in a case where the distance between the second portion 112B and the first guide shaft 110 is smaller than 0.2% of the diameter of the first guide shaft 110, the second portion 112B may interfere with the first guide shaft 110 due to a linear expansion difference accompanied by a decrease in temperature in a case where the first bearing 112 is formed of resin and the first guide shaft 110 is formed of metal. Meanwhile, in a case the distance between the second portion 112B and the first guide shaft 110 is greater than 0.6% of the diameter of the first guide shaft 110, the second portion 112B cannot come into contact with the first guide shaft 110 as the posture of the movement frame 72 changes.

Therefore, in a case where the second portion 112B is separated from the first guide shaft 110 by a distance that is equal to or greater than 0.2% of the diameter of the first guide shaft 110 and is equal to or smaller than 0.6% of the diameter of the first guide shaft 110, it is possible to maintain the posture of the movement frame 72 with the second portion 112B coming into contact with the first guide shaft 110 as the posture of the movement frame 72 changes while preventing the second portion 112B from interfering with the first guide shaft 110 due to a linear expansion difference accompanied by a decrease in temperature.

In addition, the lens mechanism 16 includes the fixation frame 88. The fixation frame 88 is provided between the movement frame 72 and the cam tube 76 and supports the movement frame 72 and the cam tube 76. Therefore, since the movement frame 72 and the cam tube 76 are supported by the fixation frame 88, the size of the lens mechanism 16 can be reduced in comparison with a case where a first support frame supporting the movement frame 72 and a second support frame supporting the cam tube 76 are separately provided, for example.

In addition, the first guide shaft 110 and the second guide shaft 114 are provided at the fixation frame 88 (that is, a fixed member). Therefore, for example, the rattling of the movement frame 72 can be suppressed in comparison with a structure in which the first guide shaft 110 and the second guide shaft 114 are provided at a movable member.

In addition, the second bearing 116 is formed in a shape resembling a U-shaped groove extending in the optical axis direction. A bottom portion of the shape of the second bearing 116 which resembles a U-shaped groove is positioned closer to the optical axis OA side than the second guide shaft 114 is and an open portion of the shape of the second bearing 116 which resembles a U-shaped groove is positioned closer to a side opposite to the optical axis OA side than the second guide shaft 114 is. Therefore, even in a case where the distance between the first bearing 112 and the second bearing 116 is made smaller than the designed value due to manufacturing error and/or deformation or the like, the second guide shaft 114 can be displaced toward the open portion of the shape of the second bearing 116 which resembles a U-shaped groove. Accordingly, for example, it is possible to suppress an increase in sliding friction of the movement frame 72 in comparison with a case where the second bearing 116 has the same configuration as the first bearing 112.

In addition, the movement frame 72 is connected to the outer side of the second lens frame 68 via the adjustment mechanism 104 of the second lens frame 68. Therefore, the angle of the second lens frame 68 with respect to the movement frame 72 can be adjusted by means of the adjustment mechanism 104.

In addition, the lens device 12 includes the lens mechanism 16, the tilt mechanism 18 that tilts the lens mechanism 16, and the shift mechanism 20 that shifts the lens mechanism 16. Therefore, it is possible to perform a tilt imaging operation which is an imaging operation performed in a state where the lens mechanism 16 is tilted by the tilt mechanism 18 and a shift imaging operation which is an imaging operation performed in a state where the shift mechanism 20 is shifted by the shift mechanism 20.

In addition, the lens device 12 includes the revolving mechanism 22 that rotates the tilt mechanism 18 and the shift mechanism 20 around the optical axis direction. Therefore, it is possible to change a direction in which the lens mechanism 16 is tilted by rotating the tilt mechanism 18 with the revolving mechanism 22. In addition, it is possible to change a direction in which the lens mechanism 16 is shifted by rotating the shift mechanism 20 with the revolving mechanism 22.

Next, modification examples of the present embodiment will be described.

In the above-described embodiment, the first side on which the first portion 112A of the first bearing 112 is positioned is the object side, the second side on which the second portion 112B of the first bearing 112 is positioned is the image formation side. However, the first side on which the first portion 112A of the first bearing 112 is positioned may be the image formation side and the second side on which the second portion 112B of the first bearing 112 is positioned may be the object side.

In addition, in the above-described embodiment, the protrusion portion 118 is formed in an annular shape along the circumferential direction of the first guide shaft 110. However, the protrusion portion 118 may be composed of a plurality of elongated protrusions extending along the circumferential direction of the first guide shaft 110.

In addition, in the above-described embodiment, the number of the plurality of cam shafts 92 is three. However, the number of cam shafts 92 may be a number other than three.

In addition, in the above-described embodiment, the lens mechanism 16 includes the first guide shaft 110 and the second guide shaft 114 that guide the movement frame 72. However, the number of guide shafts guiding the movement frame 72 may be one or three or more.

In addition, in the above-described embodiment, the revolving mechanism 22 is a mechanism that rotates the tilt mechanism 18 and the shift mechanism 20 around the optical axis direction. However, the revolving mechanism 22 may be a mechanism that rotates any one of the tilt mechanism 18 or the shift mechanism 20 around the optical axis direction.

In addition, in the above-described embodiment, the lens device 12 includes the tilt mechanism 18, the shift mechanism 20, and the revolving mechanism 22. However, at least one of the tilt mechanism 18, the shift mechanism 20, or the revolving mechanism 22 may be omitted.

Contents described and illustrated above are for detailed description of a part according to the present disclosed technology and are merely an example of the present disclosed technology. For example, description of the above-described configurations, functions, actions, and effects is description related to an example of configurations, functions, actions, and effects of a part according to the present disclosed technology. Therefore, it is a matter of course that an unnecessary part of the contents described and illustrated above may be deleted, a new element may be added, and replacement may be made without departing from the spirit of the present disclosed technology. In addition, in order to avoid complication and facilitate the understanding of a portion according to the present disclosed technology, regarding the contents described and illustrated above, description related to common technical knowledge or the like which does not need to be described to enable implementation of the present disclosed technology has been omitted.

In the present specification, "A and/or B" has the same meaning as "at least one of A or B". That is, "A and/or B" means "A, B, or a combination of A and B". In addition, in the present specification, the same concept as in the case of "A and/or B" applies to a case where three or more matters are expressed together by "and/or".

All publications, patent applications, and technical standards described in the present specification are incorporated herein by reference to the same extent as if each publication, patent application, or technical standard was specifically and individually indicated to be incorporated by reference.

What is claimed is:

1. A lens mechanism comprising:
   a lens holding member that holds a lens;
   a movement member that is connected to the lens holding member and that moves in an optical axis direction; and
   a guide shaft that guides movement of the movement member,
   wherein the movement member includes a bearing portion into which the guide shaft is inserted,
   the bearing portion includes a first portion and a second portion,
   the first portion comes into contact with the guide shaft, and the guide shaft is movably inserted into the second portion, wherein the first portion includes a protrusion portion that comes into contact with the guide shaft, wherein the protrusion portion is formed in a convexly curved planar shape as seen in a longitudinal cross-sectional view and comes into contact with an outer peripheral surface of the guide shaft.

2. The lens mechanism according to claim 1, wherein the first portion is positioned on a first side of the bearing portion, and the second portion is positioned on a second side of the bearing portion.

3. The lens mechanism according to claim 2, wherein the first side is an object side, and the second side is an image formation side.

4. The lens mechanism according to claim 1, wherein the protrusion portion is formed along a circumferential direction of the guide shaft.

5. The lens mechanism according to claim 1, further comprising:

a cam tube that is disposed outside the movement member; and an operation member that is connected to an outer side of the cam tube, wherein the movement member is provided with a cam shaft, the cam tube includes a cam groove that engages with the cam shaft, and the movement member moves in the optical axis direction in a case where the cam shaft moves along the cam groove as the operation member and the cam tube rotate.

6. The lens mechanism according to claim 5, wherein the number of a plurality of the cam shafts is three.

7. The lens mechanism according to claim 5, further comprising:

a fixation member that is provided between the movement member and the cam tube and that supports the movement member and the cam tube.

8. The lens mechanism according to claim 7, wherein the guide shaft is provided at the fixation member.

9. The lens mechanism according to claim 1, wherein the movement member is connected to an outer side of the lens holding member via an adjustment mechanism of the lens holding member.

10. The lens mechanism according to claim 1, wherein the second portion is separated from the guide shaft by a distance that is equal to or greater than 0.2% of a diameter of the guide shaft and is equal to or smaller than 0.6% of the diameter of the guide shaft.

11. The lens mechanism according to claim 1, wherein a first guide shaft is provided as the guide shaft, and a second guide shaft that guides movement of the movement member is provided.

12. A lens device comprising:

the lens mechanism according to claim 1;

a tilt mechanism that tilts the lens mechanism;

a shift mechanism that shifts the lens mechanism; and a rotation mechanism that rotates at least one of the tilt mechanism or the shift mechanism around the optical axis direction.

\* \* \* \* \*